(12) United States Patent
Scolari et al.

(10) Patent No.: US 8,128,111 B2
(45) Date of Patent: Mar. 6, 2012

(54) SCOOTER AND PEDAL DRIVE ASSEMBLY

(75) Inventors: Nathan Anthony Scolari, Greenville, SC (US); Daniel Robert Cabral, Greenville, SC (US); Geoffrey Michael Bergmark, Hendersonville, NC (US)

(73) Assignee: Zike, LLC, Greenville, SC (US)

( * ) Notice: Subject to any disclaimer, the term of this patent is extended or adjusted under 35 U.S.C. 154(b) by 52 days.

(21) Appl. No.: 12/848,567

(22) Filed: Aug. 2, 2010

(65) Prior Publication Data

US 2011/0057411 A1  Mar. 10, 2011

Related U.S. Application Data

(63) Continuation-in-part of application No. 12/554,366, filed on Sep. 4, 2009.

(51) Int. Cl.
*B62M 1/04* (2006.01)
*B62M 3/00* (2006.01)

(52) U.S. Cl. .......................... 280/221; 280/256
(58) Field of Classification Search ............. 280/220, 280/221, 252, 253, 256, 257, 259–261, 87.041
See application file for complete search history.

(56) References Cited

U.S. PATENT DOCUMENTS

| | | |
|---|---|---|
| 211,868 A | 2/1879 | Smith |
| 272,377 A | 2/1883 | Davis |
| 324,826 A * | 8/1885 | Fritz .......................... 280/1.191 |
| 564,948 A | 7/1896 | Stover |
| 595,535 A | 12/1897 | Edwards |
| 597,621 A | 1/1898 | Russell |
| 608,674 A | 8/1898 | Harshner |
| 612,865 A | 10/1898 | Muslar |
| 617,390 A | 1/1899 | Beebe |
| 636,658 A | 11/1899 | Grace |
| 647,982 A | 4/1900 | Owen |
| 732,553 A | 6/1903 | Hider |
| 813,741 A | 2/1906 | Rudbeck |
| 1,272,761 A | 7/1918 | Bailey |
| 1,283,819 A | 11/1918 | Lee |
| 1,330,011 A | 2/1920 | Russo |
| 1,342,791 A | 6/1920 | Bodman |
| 1,388,004 A | 8/1921 | Schmit |
| 1,477,544 A | 7/1922 | D'Antonio |
| 1,566,669 A | 12/1922 | Greene |

(Continued)

FOREIGN PATENT DOCUMENTS

CN 2661545 12/2004

(Continued)

*Primary Examiner* — Anne Marie M Boehler
(74) *Attorney, Agent, or Firm* — David L. King

(57) ABSTRACT

An improved two wheeled reciprocating pedal driven scooter has a frame, front steering wheel, rear drive wheel, and rear wheel drive mechanism. The drive mechanism has two reciprocating foot pedals straddling the frame and extending to a forward hinge attachment location on the frame. The hinge location is at or above a drive axle. Each foot pedal has a short portion and an intersecting long portion forming a bend. The bend angle is 90 degrees or greater and is located at or below the frame. The attachment location of the foot pedal to the drive mechanism is at or near the bend. When the long portion of one foot pedal is at the bottom of the foot pedal stroke it is substantially horizontal, while the long portion of the other pedal is at the top of the stroke and is inclined to a maximum stroke angle of less than 35 degrees.

20 Claims, 12 Drawing Sheets

U.S. PATENT DOCUMENTS

| | | |
|---|---|---|
| 1,473,356 A | 11/1923 | Pine |
| 1,535,714 A * | 4/1925 | Burke .......................... 280/261 |
| 1,653,889 A | 11/1926 | Clark |
| 1,667,940 A | 5/1928 | Life |
| 2,053,835 A | 12/1933 | Kimball |
| 2,251,005 A | 12/1940 | Rubinich |
| 2,466,105 A | 5/1946 | Hoffman |
| 2,486,513 A | 11/1949 | Billey |
| 2,544,996 A | 3/1951 | Kander |
| 3,039,790 A | 5/1959 | Trott |
| 3,375,023 A | 3/1968 | Cox |
| 3,820,820 A | 6/1974 | Kutz |
| 3,913,945 A | 10/1975 | Clark |
| 3,954,282 A | 5/1976 | Hege |
| 4,026,571 A | 5/1977 | Vereyken |
| 4,161,328 A | 7/1979 | Efros |
| 4,186,934 A | 2/1980 | Collings |
| 4,456,276 A | 6/1984 | Botorlin |
| 4,564,206 A | 1/1986 | Lenhardt |
| 4,577,879 A | 3/1986 | Vereyken |
| 4,779,863 A | 10/1988 | Yang |
| 4,828,284 A | 5/1989 | Sandgren |
| 5,107,950 A | 4/1992 | Horiike |
| 5,125,288 A | 6/1992 | Amiet |
| 5,172,926 A | 12/1992 | Mannino |
| 5,224,724 A | 7/1993 | Greenwood |
| 5,242,182 A | 9/1993 | Bizerra |
| 5,294,140 A | 3/1994 | Rinkewich |
| 5,351,575 A | 10/1994 | Overby |
| 5,368,321 A | 11/1994 | Berman |
| 5,383,829 A | 1/1995 | Miller |
| 5,442,972 A | 8/1995 | Hoover |
| 5,451,070 A | 9/1995 | Lindsay et al. |
| 5,492,345 A | 2/1996 | Kruczek |
| 5,520,401 A | 5/1996 | Mohseni |
| 5,527,246 A | 6/1996 | Rodgers, Jr. |
| 5,611,757 A | 3/1997 | Rodgers, Jr. |
| 5,716,069 A | 2/1998 | Bezerra et al. |
| 5,823,554 A | 10/1998 | Lau |
| 5,899,119 A | 5/1999 | Coment |
| 5,988,662 A | 11/1999 | Staehlin |
| 6,209,900 B1 | 4/2001 | Yoshizawa |
| 6,270,102 B1 | 8/2001 | Fan |
| 6,382,043 B1 | 5/2002 | Lin |
| 6,402,173 B1 | 6/2002 | Chiu |
| 6,406,047 B1 | 6/2002 | Sawyer, Jr. |
| 6,439,590 B1 | 8/2002 | Liang |
| 6,554,309 B2 | 4/2003 | Thir |
| 6,648,353 B1 | 11/2003 | Cabal |
| 6,648,355 B2 | 11/2003 | Ridenhour |
| 6,663,127 B2 | 12/2003 | Miller |
| 6,715,779 B2 | 4/2004 | Eschenbach |
| 6,716,141 B2 | 4/2004 | Bhoopathy |
| 6,769,706 B2 | 8/2004 | Chow |
| 7,293,789 B1 | 11/2007 | Efros |
| 7,300,065 B2 | 11/2007 | Tal |
| 7,377,532 B2 | 5/2008 | Bauce |
| 7,497,453 B2 | 3/2009 | Fan |
| 7,584,978 B2 | 9/2009 | Pourias |
| 7,669,869 B2 | 3/2010 | Meguerditchian |
| 7,784,808 B2 | 8/2010 | Fan |
| 2003/0025293 A1 | 2/2003 | Drew |
| 2005/0248117 A1 | 11/2005 | Hung |
| 2006/0066072 A1 | 3/2006 | Scarborough |
| 2006/0249925 A1 | 11/2006 | Yan |
| 2007/0235974 A1 | 10/2007 | Vargas |
| 2009/0134597 A1 | 5/2009 | Buchberger et al. |
| 2009/0224506 A1 | 9/2009 | Sakirov |
| 2009/0315294 A1 | 12/2009 | Conti |
| 2010/0001487 A1 | 1/2010 | Pang |

FOREIGN PATENT DOCUMENTS

| | | |
|---|---|---|
| CN | 101105220 | 1/2008 |
| CN | 201161687 | 12/2008 |
| CN | 201165310 | 12/2008 |
| CN | 201195586 | 2/2009 |
| CN | 101480987 | 7/2009 |
| DE | 4319104 | 12/1994 |
| DE | 29602729 | 6/1997 |
| DE | 10141416 | 3/2003 |
| DE | 10332133 | 7/2003 |
| DE | 10312878 | 10/2004 |
| DE | 102006027871 | 12/2007 |
| FR | 501552 | 4/1920 |
| FR | 2579950 | 10/1986 |
| GB | 189714126 | 5/1898 |
| GB | 333283 | 8/1930 |
| GB | 541014 | 11/1941 |
| GB | 2332403 | 6/1999 |
| GB | 2359285 | 8/2001 |
| GB | 2459485 | 4/2008 |
| JP | 10053186 | 2/1998 |
| JP | 2007008296 | 1/2007 |
| KR | 20070080633 | 8/2007 |
| WO | 8301764 | 5/1983 |
| WO | 9707861 | 3/1997 |
| WO | 0230732 | 4/2002 |
| WO | 2007126476 | 11/2007 |
| WO | 2008012861 | 1/2008 |
| WO | 2008023369 | 2/2008 |
| WO | 2008032969 | 3/2008 |
| WO | 2008101502 | 8/2008 |
| WO | 2009035278 | 3/2009 |
| WO | 2009136088 | 11/2009 |

\* cited by examiner

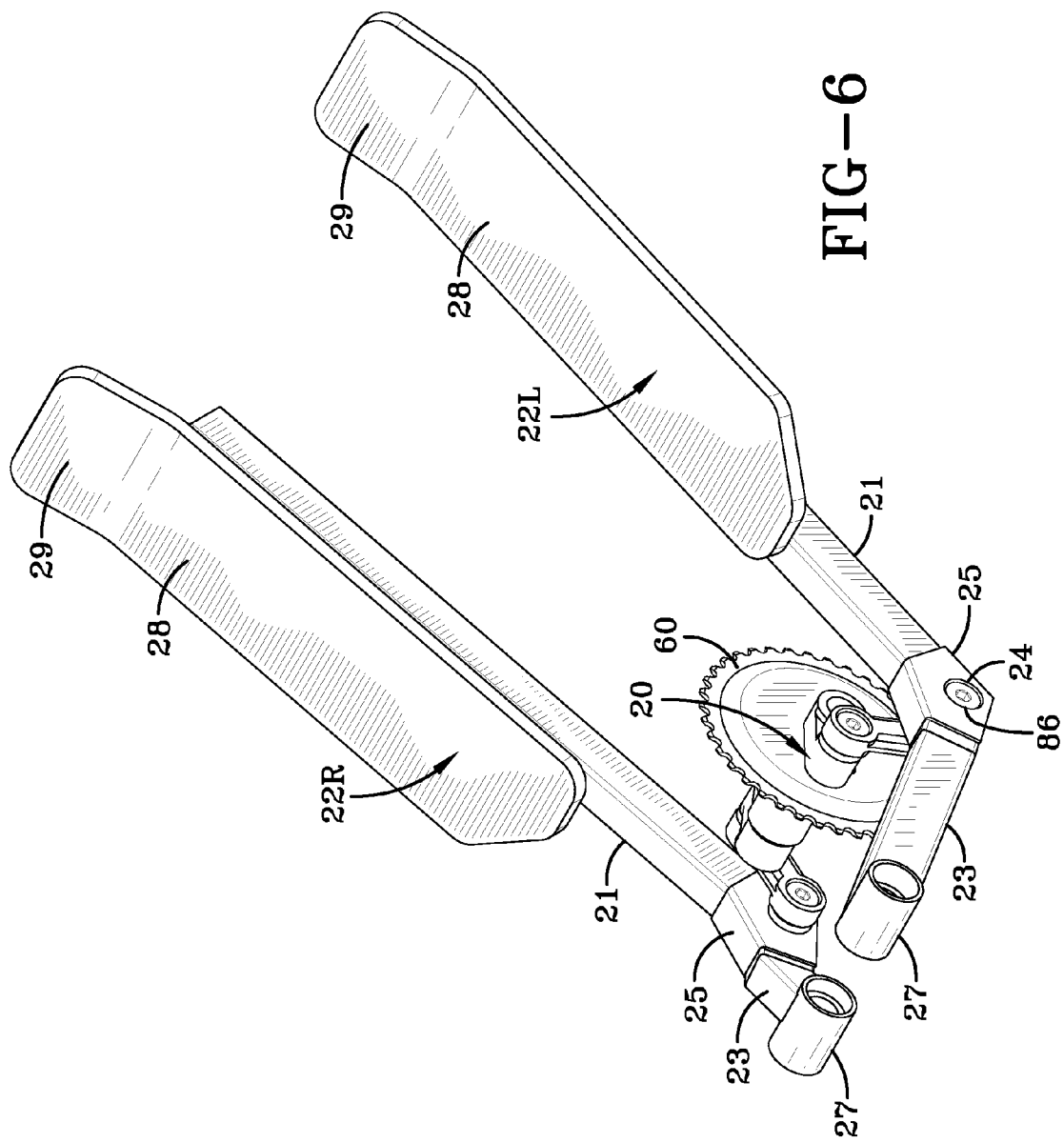

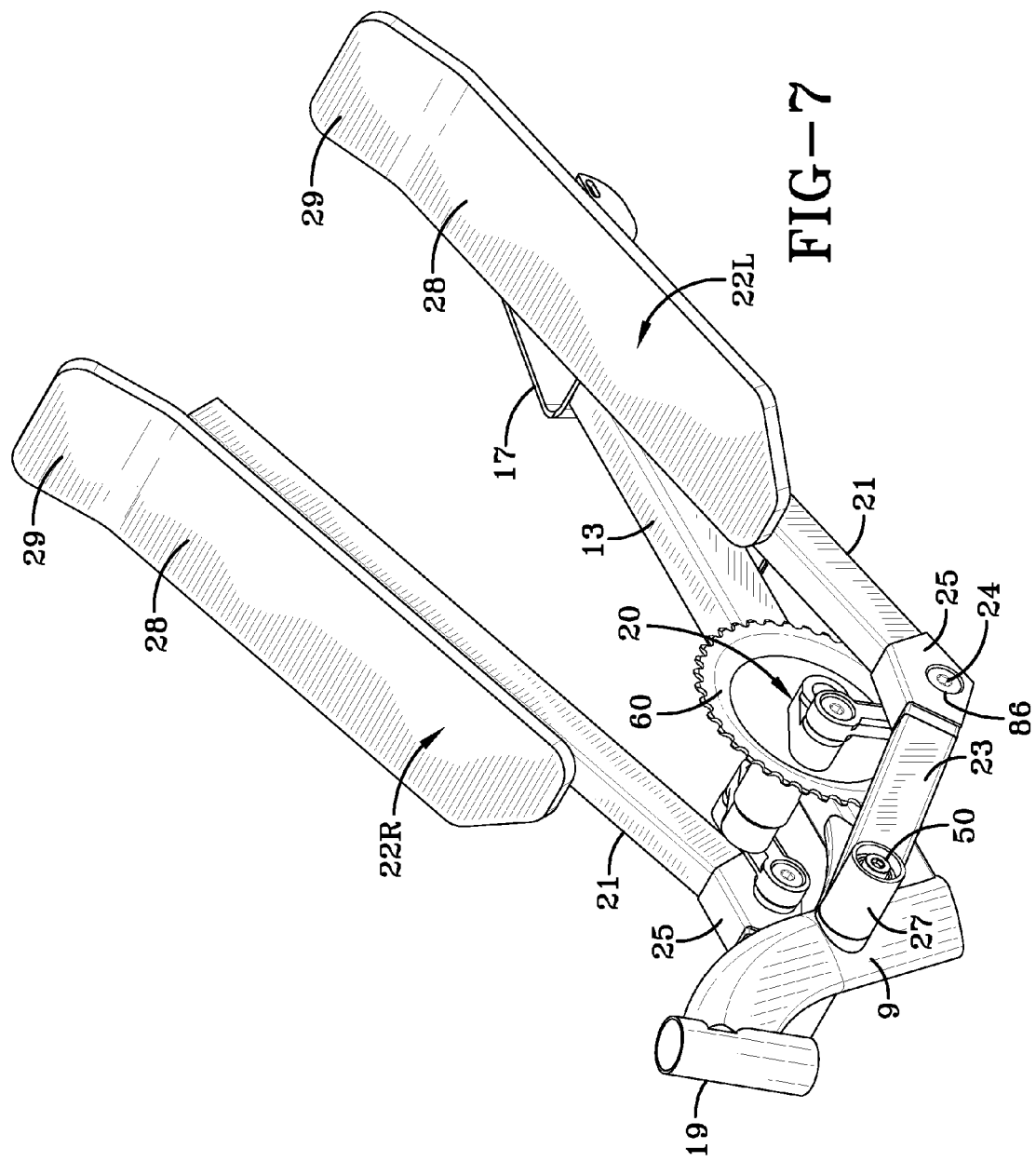

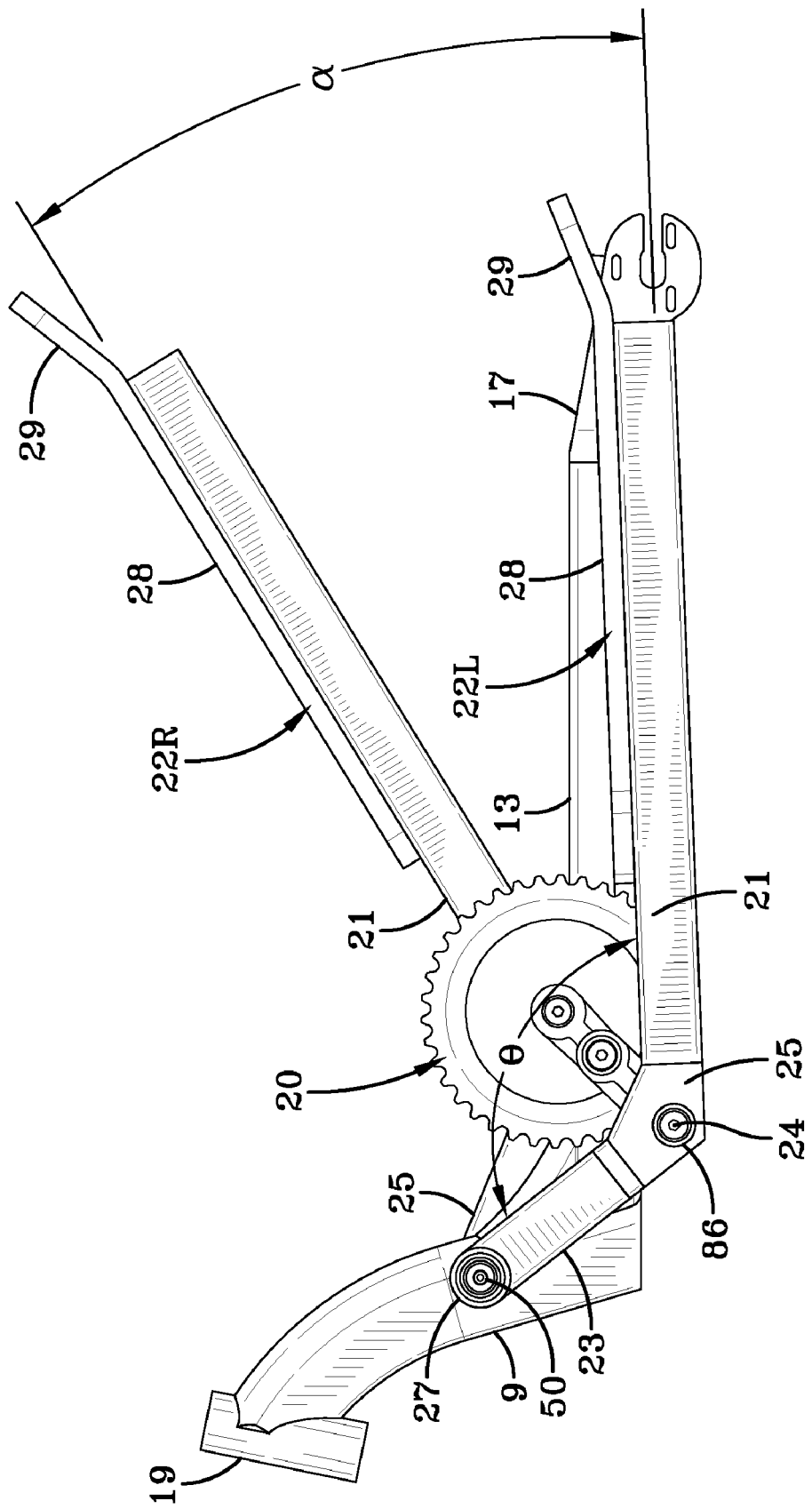

| | | | | | Rear Wheel Speed | | | | | | | | | | |
|---|---|---|---|---|---|---|---|---|---|---|---|---|---|---|---|
| | | | | | | MPH, Rear Wheel Size in Inches (OD) | | | | | | | | | |
| S1(RPM) | T1 | T2 | T3 | T4 | S4(RPM) | 6.0 | 7.0 | 8.0 | 9.0 | 10.0 | 12.0 | 14.0 | 16.0 | 18.0 | 20.0 |
| 50 | 48 | 9 | 9 | 9 | 266.7 | 4.8 | 5.6 | 6.3 | 7.1 | 7.9 | 9.5 | 11.1 | 12.7 | 14.3 | 15.9 |
| 50 | 42 | 8 | 8 | 8 | 262.5 | 4.7 | 5.5 | 1.0 | 7.0 | 7.8 | 9.4 | 10.9 | 12.5 | 14.1 | 15.6 |
| 50 | 32 | 14 | 32 | 9 | 406.3 | 7.3 | 8.5 | 9.7 | 10.9 | 12.1 | 14.5 | 16.9 | 19.3 | 21.8 | 24.2 |
| 50 | 34 | 16 | 32 | 8 | 425.0 | 7.6 | 8.9 | 10.1 | 11.4 | 12.6 | 15.2 | 17.7 | 20.2 | 22.8 | 25.3 |
| 50 | 36 | 14 | 40 | 8 | 571.4 | 10.2 | 11.9 | 13.6 | 15.3 | 17.0 | 20.4 | 23.8 | 27.2 | 30.6 | 34.0 |
| 50 | 34 | 14 | 34 | 9 | 516.1 | 9.2 | 10.7 | 12.3 | 13.8 | 15.4 | 18.4 | 21.5 | 24.6 | 27.6 | 30.7 |
| 50 | 30 | 14 | 30 | 8 | 401.8 | 7.2 | 8.4 | 9.6 | 10.8 | 12.0 | 14.3 | 16.7 | 19.1 | 21.5 | 23.9 |
| 50 | 32 | 14 | 30 | 9 | 381.0 | 6.8 | 7.9 | 9.1 | 10.2 | 11.3 | 13.6 | 15.9 | 18.1 | 20.4 | 22.7 |
| 50 | 32 | 14 | 30 | 8 | 428.6 | 7.7 | 8.9 | 10.2 | 11.5 | 12.8 | 15.3 | 17.9 | 20.4 | 23.0 | 25.5 |
| 50 | 42 | 22 | 32 | 16 | 190.9 | 3.4 | 4.0 | 4.5 | 5.1 | 5.7 | 6.8 | 8.0 | 9.1 | 10.2 | 11.4 |
| 50 | 40 | 14 | 40 | 9 | 634.9 | 11.3 | 13.2 | 15.1 | 17.0 | 18.9 | 22.7 | 26.4 | 30.2 | 34.0 | 37.8 |
| 50 | 42 | 14 | 42 | 16 | 393.8 | 7.0 | 8.2 | 9.4 | 10.5 | 11.7 | 14.1 | 16.4 | 18.7 | 21.1 | 23.4 |
| 50 | 42 | 14 | 40 | 14 | 428.06 | 7.7 | 8.9 | 10.2 | 11.5 | 12.8 | 15.3 | 17.9 | 20.4 | 23.0 | 25.5 |
| 50 | 42 | 14 | 42 | 14 | 450.0 | 8.0 | 9.4 | 10.7 | 12.0 | 13.4 | 16.1 | 18.7 | 21.4 | 24.1 | 26.8 |
| 50 | 42 | 14 | 40 | 16 | 375.0 | 6.7 | 7.8 | 8.9 | 10.0 | 11.2 | 13.4 | 15.6 | 17.9 | 20.1 | 22.3 |
| 50 | 42 | 16 | 38 | 16 | 311.7 | 5.6 | 6.5 | 7.4 | 8.3 | 9.3 | 11.1 | 13.0 | 14.8 | 16.7 | 18.5 |
| 50 | 28 | 16 | 45 | 9 | 437.5 | 7.8 | 9.1 | 10.4 | 11.7 | 13.0 | 15.6 | 18.2 | 20.8 | 23.4 | 26.0 |

FIG-11

SCOOTER AND PEDAL DRIVE ASSEMBLY

RELATED APPLICATIONS

This patent application is a continuation in part of U.S. patent application Ser. No. 12/554,366 filed on Sep. 4, 2009 entitled "Pedal-Drive System for Manually Propelling Multi Wheeled Cycles". The present application claims priority to this related application.

TECHNICAL FIELD

This application relates to rider propelled vehicles using a pair of reciprocating foot pedals for propulsion. More particularly to improved scooters and the drive mechanism to propel them.

BACKGROUND OF THE INVENTION

A rider powered scooter as is generally understood is typically a two wheeled vehicle with a front free rolling, steerable wheel and a rear free rolling, non-steerable wheel connected to each other by a frame including a rider platform positioned between the wheels on which the rider can support himself. To move, the rider can roll or coast downhill and on level or elevated ground can use one foot to push off the ground as the other foot rests on the platform. To start rolling, the rider often runs along side the scooter to reach speed and jumps onto the platform to ride using the one foot push method to maintain motion. These simple coaster type scooters had gained popularity among young riders as they were generally easy to ride and required less skill to ride than a skateboard device which has no true steering mechanism other than weight shifting which required rider skill, balance and agility to steer the device. Both the scooter and the skateboard's use of very small wheels permitted the platforms to be very low relative to the ground. This improved the stability of these free rolling scooters. Scooters have no easy way to maintain speed and are somewhat limited in performance. Unlike skateboards which could be used in a variety of exciting ways including jumps and wheelies and other tricks, these coaster scooters simply are more limited and shortly after the excitement of the initial purchase, the child simply got bored or tired of the device. The scooter simply was not as much fun as a skateboard and could not compete with a bicycle in terms of performance, so the device was relegated to a fad which over time may lose children's interest.

Recently, to give the scooters some added appeal, several devices suggested adding one or two pedals to help propel the scooter such as the one described in U.S. Pat. No. 7,487,987 B2. One such three wheeled device called Pumgo® was made, marketed and sold, but this device is so slow, difficult to turn without tipping, hard to maintain balance and due to this provides limited entertainment and also is not a practical transportation device.

To overcome this lack of performance problem, an improved scooter concept was disclosed in a related patent application to which the present application claims priority. In that invention, the use of a reciprocating foot pedal scooter was disclosed using a drive mechanism that was described as a pair of two bar linkages. This co-pending application provided a scooter with the potential speed of a bicycle, this improved performance is a undoubtedly a desirable enhancement to make the scooter a more functional and versatile product for both young and older children as well as a viable means of transportation for both children and adults.

After prolonged research and experimental prototypes, and evaluations the development of that original concept has been markedly improved with technical features and changes heretofore neither appreciated nor recognized. The following description provides this latest improvement over the original basic design concept and makes this improved scooter far more reliable with superior propulsion performance and better rider stability than was previously possible.

SUMMARY OF THE INVENTION

An improved two wheeled reciprocating pedal driven scooter has a step down frame including a steering assembly attached to the frame, a front steering wheel attached to a front axle attached to the steering assembly at the frame, a rear drive wheel attached to a rear axle attached to a rear portion of the frame and a drive mechanism for rotating the rear drive wheel. The drive mechanism has a pair of reciprocating foot pedals, one foot pedal straddling each side of the frame, attached to and extending to a forward proximal hinge attachment location on the frame. The drive mechanism further has a drive sprocket positioned rearward of the forward proximal hinge attachment location and attached to a drive axle in a bottom bracket assembly on the frame, a pair of linkage connections attaching each foot pedal to the first drive axle of the drive sprocket, one pair of linkage connections being adjacent to drive sprocket, the other pair of linkage connections connected on an opposite side of the frame to an end of the drive axle. Each pair of linkage connections includes a crank link and a coupling link. In one embodiment, a chain is attached to the drive sprocket and extends rearward to a rear wheel drive sprocket attached to a rear drive axle in a rear hub of the rear wheel.

In a second embodiment, a first chain is attached to the drive sprocket and extends rearward to a first intermediate sprocket attached to an intermediate axle in a second bottom bracket fixed on the frame between the drive sprocket and rear drive wheel; a second intermediate sprocket is attached to the intermediate axle on an opposite side of the frame relative to the first intermediate sprocket. A second drive chain is connected to the second intermediate sprocket and extends rearward to a rear wheel drive sprocket attached to a rear drive axle in a hub of the rear wheel.

Reciprocation movement of the foot pedals drives the rear wheel. A free wheeling clutch mechanism may be mounted in one of the bottom brackets or rear hub to enable the rear wheel to free wheel spin as the foot pedals are stationary in a coasting, non-reciprocating position. The drive mechanism forms a four bar linkage having a crank link, a coupling link, a pedal link and a virtual frame link. The four bar linkage is defined by the distance between centers, wherein the crank link dimension C1 extends between the center of the drive axle to the center of the coupling and crank attachment, the coupling link dimension C2 extends from the center of the coupling link and the crank attachment to the center of the foot pedal attachment, the pedal link dimension P extends from the center of the coupling link and the foot pedal attachment to the center of proximal hinge location, and the virtual frame link dimension F extends from the center of the proximal hinge location to the center of the drive axle. The crank dimension C1 is less than the coupling dimension C2 and the power is transmitted through the foot pedals to drive the coupling link and crank link to rotate the drive sprocket and drive axle, the improvements to the two wheeled reciprocating pedal driven scooter characterized by: each of the foot pedals having a short portion and an intersecting long portion forming a bend at the intersection wherein an included angle θ between the short and long portions is 90 degrees or greater, preferably between 90 and 135 degrees, most preferably about 126 degrees. The attachment location of the foot pedal to the coupling is at, near or adjacent to the intersection forming the bend of the short and long portions of each foot pedal. The proximal hinge location is vertically located on the frame a distance "Y" at or above the center of the drive axle. The short portion of the pedal extends a distance from the proximal hinge location to the intersection of the long portion of the foot pedal to form the bend wherein the bend is located at or below the frame. In use, when the long portion of one foot pedal is at the bottom of the foot pedal stroke it is substantially horizontal while the long portion of the other pedal is at the top of the stroke and is inclined to a maximum stroke angle α of less than 35 degrees, preferably 29 degrees. The two wheeled reciprocating pedal driven scooter preferably has the length of the coupling dimension C2 being more than 150 percent of the crank dimension C1, the dimension "Y" is greater than 44 mm and the dimension P is less than the dimension F. The crank link adjacent the drive sprocket is preferably pinned to or otherwise rotationally fixed to both the drive sprocket and drive axle.

BRIEF DESCRIPTION OF THE DRAWINGS

FIG. 6 is a perspective view of the foot pedals attached to the drive mechanism.

FIG. 7 is a perspective view of the foot pedals and drive mechanism attached onto the frame.

FIG. 7A is a plan view of foot pedals and drive mechanism on the frame of FIG. 7.

FIG. 11 is a table showing gear and tire sizes and expected performance speeds.

DETAILED DESCRIPTION OF THE INVENTION

Figure 1:
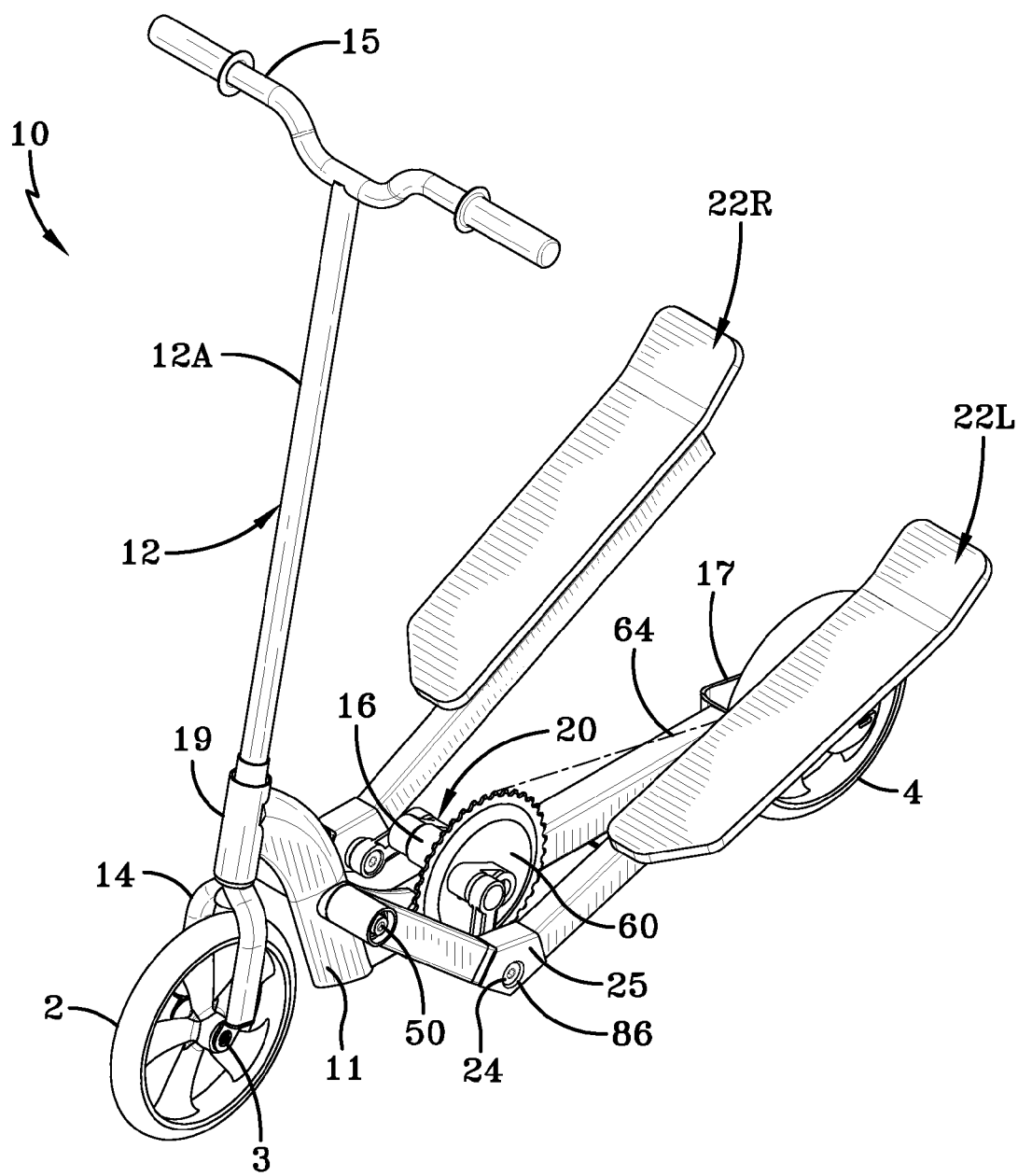
FIG. 1 shows a perspective view of the scooter made according to a first embodiment of the invention.
Figure 2A:
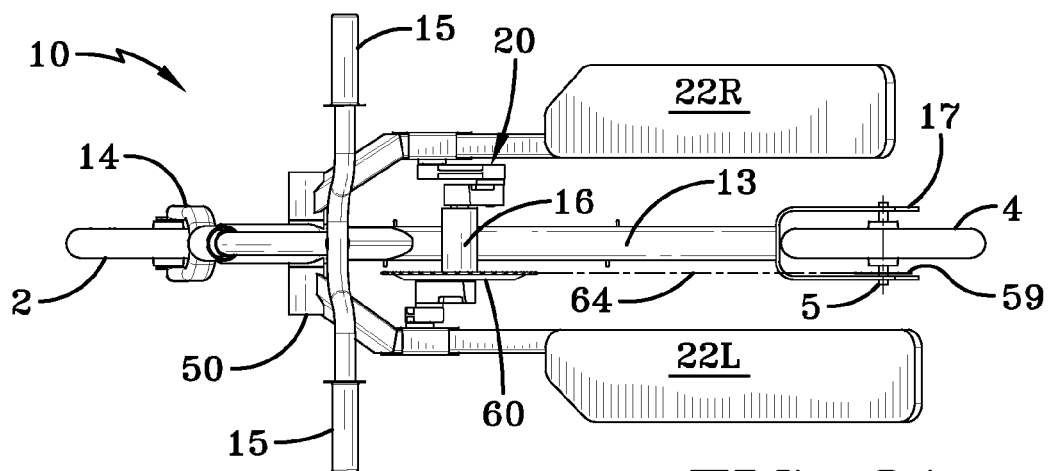
FIG. 2A is a top view of the scooter of FIG. 1.
Figure 2:
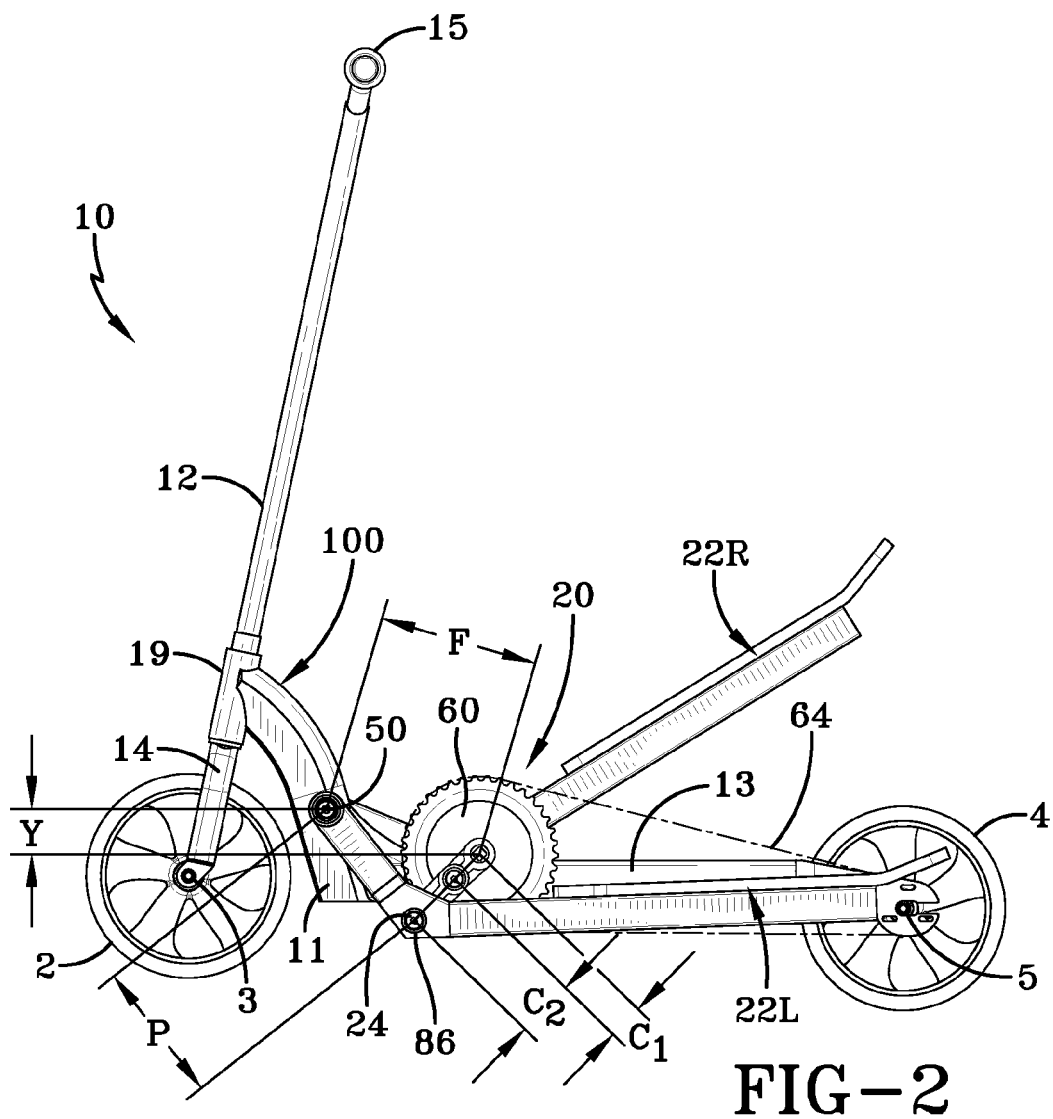
FIG. 2 is a side view of the scooter of FIG. 1.
Figure 5:
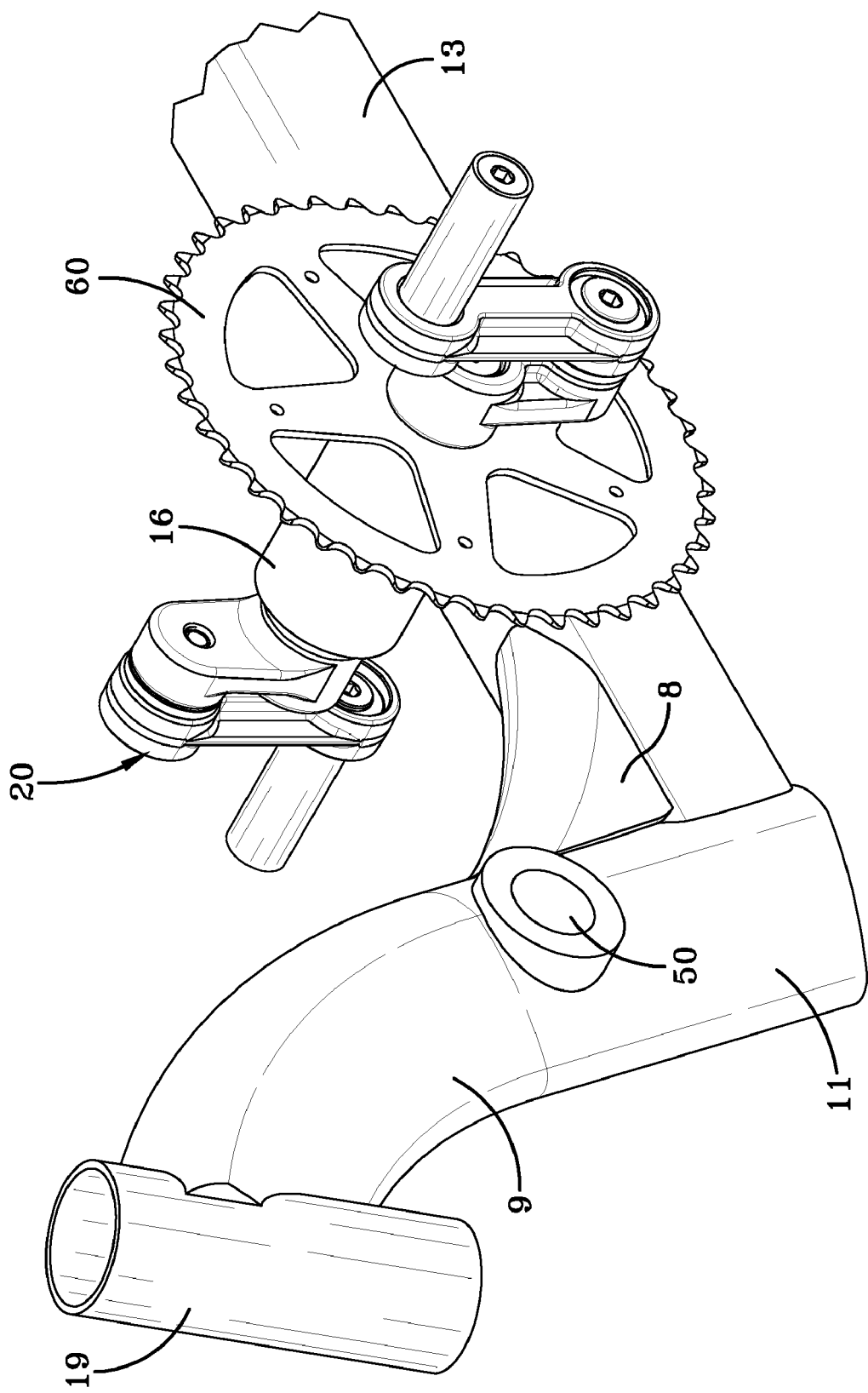
FIG. 5 is a plan view of the drive mechanism attached to the frame of the scooter.

With reference to FIGS. 1, 2 and 2A, an improved pedal drive scooter 10 is illustrated. The scooter 10, as shown in FIG. 1, has a frame 11 including a handlebar assembly 12 including the handle bar grips 15, a shaft 12A which extends through and is secured to a hub 19 on the frame 11 of the scooter 10. The shaft 12A extends below the hub 19 to a forked portion 14 which is secured to an axle 3 on the front wheel 2 of the scooter 10. The steering assembly 12 allows the front wheel to be maneuvered for steering and turning. The frame structure 11 extends from the hub 19 rearwardly to a yoke 17 which connects the rear wheel 4 to the frame 11. As illustrated in FIG. 5, the frame 11 is a step down frame having a step down portion which is connected to the hub 19 and extends substantially downwardly to the bottom of a frame 11 to which a main frame support bar 13 is attached. As shown, at the attachment of the main support bar 13 to the step down portion 9 of the frame, a supporting gusset 8 is welded providing additional strength and stiffness at this location. Welded onto the main support bar 13 is a bottom bracket 16, this bottom bracket 16 provides a location for a drive mechanism 20 assembly to be mounted. The drive mechanism 20, as illustrated in FIG. 2A, includes a drive sprocket 60. Attached to the drive sprocket 60 is a drive chain 64 which extends rearwardly back to the rear wheel sprocket 59. The sprocket 59 is attached to the axle 5 of the rear wheel 4 and as the device is operated, turns the rear wheel 4 providing forward propulsion.

Attached to each side of the frame 11, as illustrated in FIGS. 1, 2 and 2A, are a pair of foot pedals 22R and 22L. The foot pedals 22R and 22L are attached to the frame 11 at location 50. This location 50 will be referred to hereafter as the proximal hinge attachment location 50. The foot pedal 22L is a mirror image of the foot pedal 22R. These foot pedals operate in reciprocating motion, up and down and are connected to the sprocket 60 to provide forward propulsion. As the pedals are moved in an up and down direction, the sprocket 60 is rotated moving the chain 64 which in turn moves the rear sprocket 59, and propels the rear wheel 4.

Figure 3:
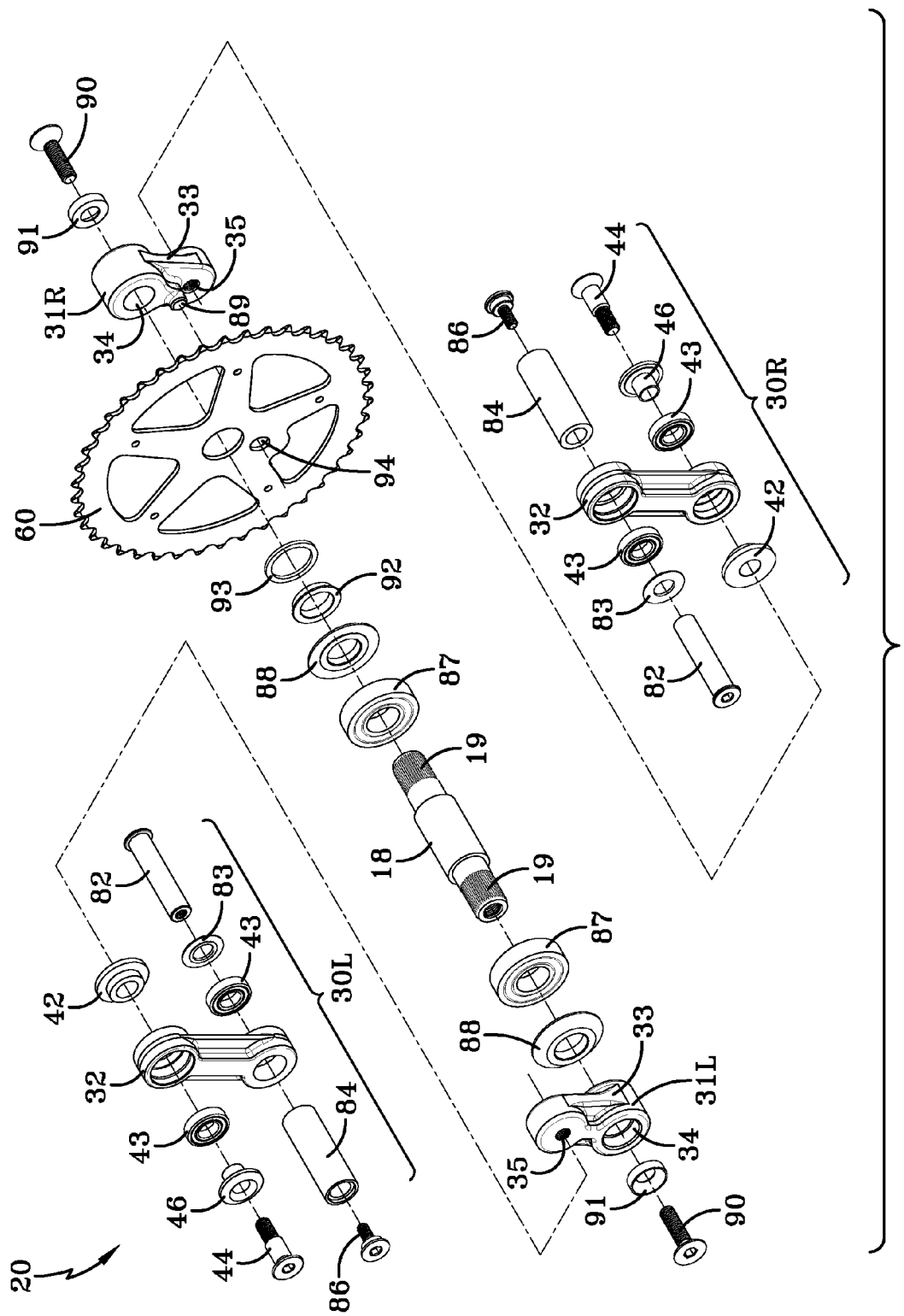
FIG. 3 is an exploded view of the drive mechanism assembly of the scooter.

For a better understanding of the drive mechanism 20, an exploded view is illustrated in FIG. 3. This drive mechanism 20 is connected to an axle 18. The axle 18 has a pair of splined ends 19. Over the axle 18 a pair of bearings 87 are inserted, these bearings 87 are pressed onto the axle or slipped over the axle and extend to the shoulder of the axle 18 as illustrated. A washer or bushing 88 is shown attached on the axial outer side of each bearing 87. A shoulder bushing 92 is then placed next to the bushing 88. A washer 93 is attached onto the shoulder bushing 92 and the sprocket 60 is then positioned onto the shoulder bushing 92 and washer 93. The sprocket 60 includes a locating hole 94 to which the crank lever link 31R is positioned with the splined opening 34 aligned with a center hole on the sprocket 60 and an integral projection or pin 89 on the crank link 31R is fitted into the hole 94 to securely rotationally lock the crank link 31R to the sprocket 60. All of these components are then slid over the splined end 19 of the axle 18 and the opening 34 of the crank link 31R is pressed onto the splined end 19 of the axle 18. As further illustrated, a washer 91 is inserted into the crank link 31R and a threaded fastener 90 is screwed directly into the axle 18 at the threaded opening in the splined portion 19. As further illustrated, a coupling link 32 is then attached to the crank link 31R at threaded opening 35. In order to make this assembly, the coupling link 32 at the lower end has a bushing 42 that is inserted into one side of the coupling link 32, a bearing 43 is positioned into the coupling link opening on the opposite side and a sleeved bushing 46 is inserted into the bearing 43 through which a threaded fastener 44 is inserted and threadingly engaged into the threaded opening 35 of the crank link 31R or 31L, securing the coupling link 32 to the crank links 31R or 31L. A pedal attachment link location at the other end of the link 32 is shown wherein a threaded sleeved element 82, a washer 83 and a bearing 43 are shown inserted into the opening of the coupling link 32 and a sleeve 84 is shown that slides over the sleeved portion 82 in such a fashion that a fastener 86 can then threadingly engage the component 82 to secure this assembly of components. Prior to securing the fastener 82, the pedals will be attached over the sleeve 84 and held in place by fastener 86 as will be discussed and shown later. The assembly method of the drive mechanism components can vary in sequence, however, it must be understood the axle 18 has to have at least one end free to be slid into the bottom bracket 16 of the frame prior to attaching the various components.

Figure 4:
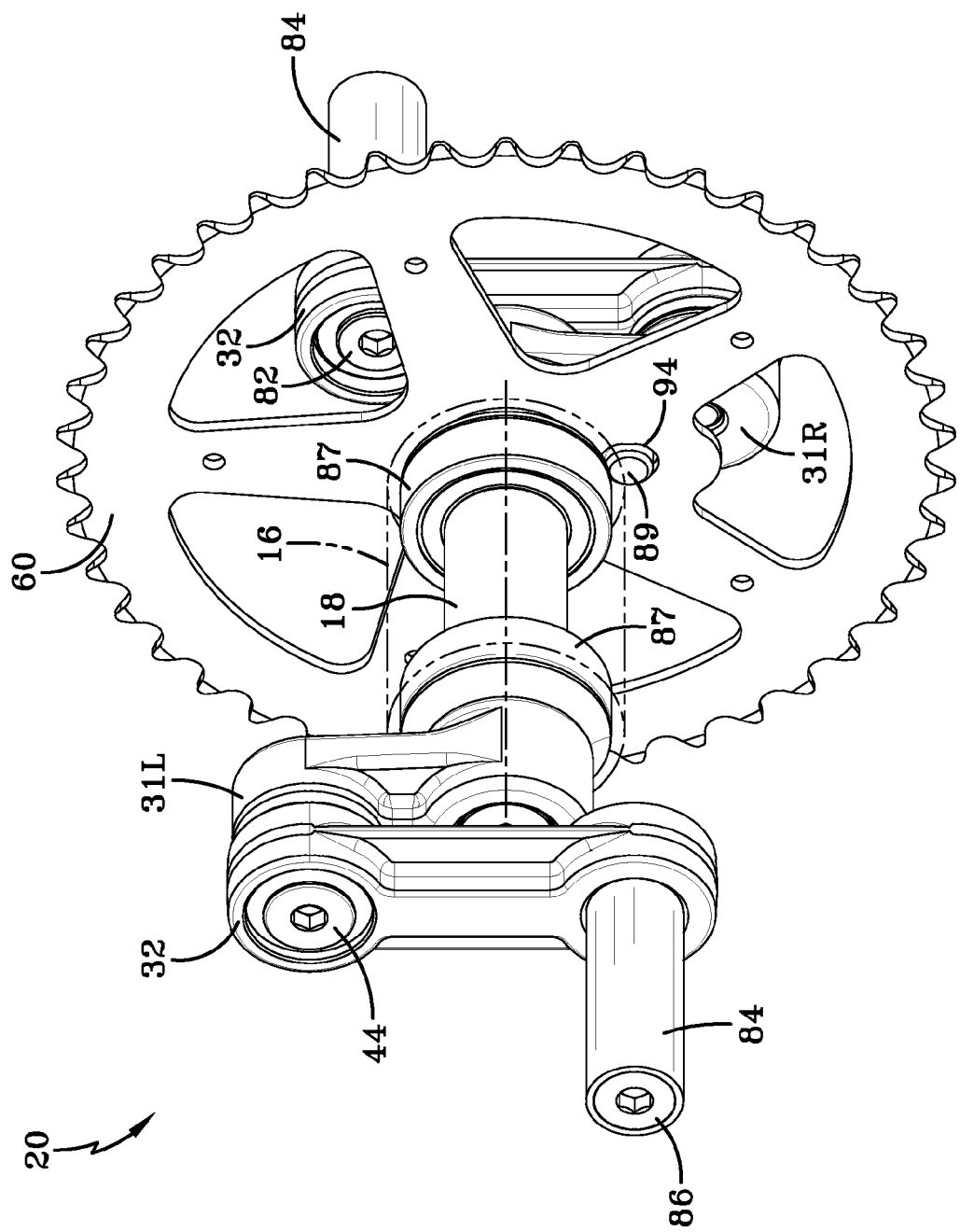
FIG. 4 is a perspective view of the assembly drive mechanism assembly.

The coupling link assembly 30L is illustrated having identical components to the coupling link 30R, as shown, coupling link 32 is attached to the crank link 31L, as illustrated. As shown, the crank link 31L has a bearing 87, a washer 88 attached onto the opposite splined end 19 of the axle 18, and the crank link 31L is then assembled onto the splined end 19 of the axle 18, a washer 91 is inserted into the opening 34 and the threaded fastener 90 is then used to attach the crank link 31L directly to the axle 18, as illustrated. The entire assembly is illustrated in FIG. 4; this drive mechanism 20 is shown secured in the bottom bracket 16 shown in phantom lines.

With reference to FIG. 5, the drive mechanism 20 is shown mounted onto a portion of the frame 11, with the pedals not yet attached.

With reference to FIG. 6, the foot pedals 22L and 22R are shown attached to the drive mechanism 20 and when assembled form the primary drive mechanism 20 for the scooter 10.

The foot pedal 22L is a mirror image of the foot pedal 22R, as illustrated in FIG. 7, the foot pedals each have a platform 28 that can include a primary flat surface upon which a foot can rest. At the rearward end of the foot pedal platform 28, the platform can be bent or angled slightly upwardly forming a heel stop portion 29 in order to provide a location for the rider's heel to be supported. This gives the rider an easy way to appreciate his foot location relative to the pedal platform 28. This also provides an optimum location for maximizing the amount of pedal power the rider has in order to have a good mechanical leverage in driving these pedals in a downward motion to propel the scooter 10. The foot pedal 22L or 22R includes a long main shaft 21 which extends from the underside of the foot pedal platform 28 forward to a coupling joint 25. The coupling joint 25 has the main shaft 21 attached on one side and has a short angled portion 23 connected to the opposite side. At the end of the short angled portion 23 is a cylindrical hub 27, this cylindrical hub 27 provides an attachment location for assembly to the frame 11. The connecting portion 25 is located precisely at the intersection or bend between the main shaft portion 21 and short angled portion 23 and provides a reinforced pedal attachment location 24 for assembly to the coupling link 32. This attachment location 24 connects the foot pedal 22L or 22R directly to the drive mechanism 20. When assembled to the frame 11, as illustrated in FIG. 7, the proximal hinge location 50 is shown wherein a threaded fastener connects the hub 27 of the pedal 22L or 22R directly to the frame 11 in the step-down portion 9 of the frame 11.

With reference back to FIG. 2, this assembly when completed as shown creates a virtual four bar linkage drive mechanism whereby the distance between the proximal hinge location 50 extends to the intersection at or near the bend to the reinforced pedal attachment location 24 and extends a distance P, as illustrated. A virtual frame link is created between the proximal hinge location 50 of the frame 11 and the axis if rotation or center of the axle 18 of the drive mechanism 20. This virtual frame link distance is illustrated as a dimension F. The two ends of the frame link are fixed in location and do not move except rotationally relative to the other. As the pedals 22L and 22R reciprocate up and down, the coupling links 32 and the crank links 31L and 31R rotate along with the sprocket 60. As illustrated, the coupling link 32 extends from the pedal attachment location 24 back to a pin location connecting the coupling links 32 and the crank link 31L or 31R. This dimension is identified as C2. Extending from the coupling link pin location and crank attachment, a distance of C1 is illustrated extending back to the drive axle 18 and the sprocket 60. It is important to note that the coupling link dimension C2 is substantially larger than the crank link dimension C1, as illustrated in FIG. 2. Preferably the coupling link dimension C2 is approximately 150 percent of the dimension C1, furthermore, it is noted that the proximal hinge location 50 attaching the foot pedal 22L or 22R to the frame 11 extends vertically, preferably, above the drive axle 18 location. This vertical distance is indicated as Y in FIG. 2.

With further reference to FIG. 7A, what is achieved by providing foot pedals 22L and 22R with a bent angled portion 23 attached to a step-down portion 9 on the frame 11 is that when a foot pedal in a full bottom position as illustrated can be made substantially horizontal relative to the ground. This enables the foot pedal in the bottom stroke to be in the most comfortable position relative to the rider. As can be seen, the foot pedals 22L, 22R provide the driving force of the sprocket 60. As illustrated in FIG. 7A, when one foot pedal 22L is in the full bottom position, the opposite foot pedal 22R is shown in the maximum stroke position $\alpha$. As illustrated, the maximum stroke position has a stroke angle $\alpha$ of approximately 29 degrees plus or minus 2 degrees. This means that as the rider reciprocates the pedals 22L or 22R in an upward and downward motion, the stroke angle is always less than 35 degrees and this means the downward force is maximized and enables the rider to more easily propel the vehicle 10. As further illustrated, due to the fact the rider's foot is positioned close to the inclined heel location portion 29, the downward driving force is greatly exaggerated due to the mechanical advantage achieved by the long main shaft 21 relative to the short bar 23. This provides a significant mechanical advantage such that the crank link 31L, 31R and coupling links 32 can be rotated achieving a maximum leverage force advantage. This creates additional torque and facilitates the rider's ability to propel the vehicle.

As shown, a significant advantage of the foot pedal mechanism employed with this improved scooter 10 is that the foot pedals 22L and 22R can be positioned at or below the wheel axles and due to the step-down frame design the ground clearance of the pedals 22L and 22R is relatively independent of the wheel size. In other words, the extending short portion 23 can be positioned such that the entire foot pedal in the bottom stroke position will be at or below the location of the frame and can be made substantially at or below the wheel axle position if so desired. This means that the vehicle has an extremely low center of gravity which provides additional stability to the rider, as such he or she will be able to maneuver the scooter with improved stability due to the fact that the rider maintains a low center of gravity during operation of the vehicle.

The above description describes an improved scooter 10 having a single drive sprocket 60 connected to a rear wheel sprocket 59 to provide propulsion for the vehicle. In this combination, the action of the pedals 22L and 22R and the movement of the rear wheel 4 are dependent on the ratio of gear sizes of the front drive sprocket 60 and the rear sprocket 59 such that the rotation of the forward sprocket 60 based on the downward stroke of the pedal 22L or 22R rotates the rear sprocket 59 by a multiplying factor if the front sprocket 60 is substantially larger than the rear sprocket 59. The front sprocket 60, when moved by a pedal 22L or 22R, will rotate the rear sprocket 59 substantially faster in terms of angular rotation thus causing the rear wheel 4 to move proportionately faster than the rotation occurring at the front sprocket 60. The ability to achieve a mechanical advantage between the sprockets is based on the ability to select sprockets of different sizes and creating different gear ratios between the front 2 and rear 4 wheels. The first embodiment provides a simple way of achieving an improved scooter device with adequate vehicle speed performance using a single chain 64.

With reference to FIGS. 8, 9, 9A, and 10, a second embodiment scooter 10A is illustrated. The second embodiment scooter 10A employs not only a first sprocket 60 and a first bottom bracket 16, but an intermediate sprocket assembly 62 wherein the intermediate sprocket assembly 62 is connected to an intermediate small sprocket 61 on the same side of the first drive sprocket 60 and is connected to the first drive chain 64, as illustrated. An intermediate bracket hub 16A is provided with an axle 18A internal of the intermediate bracket hub 16A such that the intermediate sprocket 61 can be connected directly to the intermediate sprocket 62 on the opposite side of the frame 11. The sprocket 62 is connected through a second chain 66 back to the rear drive sprocket 59, as illustrated. Fundamentally, all the other components used in the single chain driven scooter 10 are utilized in the two chain scooter 10A. In this two chain scooter 10A, an additional gear ratio multiplier advantage can be achieved wherein the first drive sprocket 60 can rotate a small intermediate sprocket 61 which then in turn can drive a larger intermediate sprocket 62 which is connected to a second chain 66 which is then connected to a smaller rear sprocket 59, as illustrated. When this occurs, propulsion of the foot pedals 22L and 22R rotates the first drive sprocket 60 through the first chain 64 rotating the smaller intermediate sprocket 61 at a substantially faster rotational speed due to the smaller gear size and the second larger intermediate sprocket 62 is then rotated at this higher speed which then in turn causes the smaller rear sprocket 59 to rotate at even a higher speed. As a result, the rider with the same stroke used in the first embodiment scooter 10 can with the gear ratios properly selected can more than double the speed achieved using the same stroke and energy.

As shown in the table of FIG. 11, the various speeds for different gear teeth ratios are shown based on a pedal stroke of 50 per minute for different tire sizes. A pedal stroke is defined as the driving leg returning to its original position after one full revolution of the drive sprocket 60. As shown in the table, if the gears $T_2$, $T_3$ and $T_4$ are the same then the table works for the scooter 10 having a single chain drive 64. If the ratios of $T_2$, $T_3$ and $T_4$ are different in and one of the these gears that indicates it is the scooter 10 with a dual drive chain assembly.

An important factor in this second embodiment is that the physical dimensions of the four bar linkage system in relation to the frame can be maintained identical to that of the first embodiment. The dimensions F for the virtual frame length, P for the distance between the proximal hinge location 50 and the pedal attachment location 24, the distance C2 of the coupling link and the distance C1 of the crank link to the axle 18 are all maintained identical to those of the first embodiment. In addition, the distance of the proximal hinge location 50 vertically relative to the axle 18 is also maintained at the distance Y as previously discussed. These factors enable the mechanical advantage and leverage that the rider enjoys and the low center of gravity to be maintained in this dual chain driven assembly shown in scooter 10A.

In the best mode of practicing the invention, the dimensions F, P, C1 and C2 where set at 175.0 mm, 155.6 mm, 38.4 mm and 63.5 mm respectively. If each of these dimensions F, P, C1 and C2 were equally changed by a fixed percentage the drive mechanism 20 would perform equally well. These dimensions, it was determined provided an extremely smooth movement of the drive mechanism. The previous co-pending application failed to understand, acknowledge or formulate optimum four bar linkage relationships and their corresponding ratios. Furthermore, by rounding of these dimensions at 175 mm, 156 mm, 38 mm and 64 mm, it was determined satisfactory performance was achieved wherein one or more of these dimensions were adjusted within plus or minus 2 mm of the settings; more preferably within plus or minus 1 mm. These dimensional locations of F, P, C1 and C2 were found to work well when Y was set at 48 mm plus or minus 4 mm, preferably within plus or minus 2 mm.

An important aspect of the dimensional positioning of the four bar linkage is proper rotation of the coupling link 32 and the crank lever 31L or 31R. If the locations are not accurately located, the drive mechanism can lock up wherein a lock up phenomena is understood to occur at a top dead center location causing the links to bind, stopping the pedals from moving. A worse problem can occur wherein the linkages can actually reverse rotational direction. In this case a pedal can abruptly slam down as the links rotate opposite to their normal or desired movement. The present invention avoids these issues by a proper selection of four bar link dimensions F, P, C1 and C2. These problems, while understood to exist, were not fully appreciated. The original concept of the prior co-pending application mistakenly believed the drive mechanism was a two bar linkage as represented by the inventors. This fails to grasp how the four bar linkage really works. Computer software which models and predicts dimensions for four bar linkage systems relies on the axle 18 to be the driving location and as such the predicted optimal locations for such a device acted perfectly when one rotated at the axle by hand, but in, in actual devices, when the drive propulsion was moved to the pedals 22L and 22R, as in the actual scooter device, these simulated models of software optimum four bar linkage solutions did not operate properly. It was determined that each of the link dimensions and the relationship of C2 being greater than C1 by at least 150 percent and the proximal hinge location were all critical. This meant finding optimal dimensions was not reliable using standard software generated solutions. The performance of the present invention was greatly enhanced by the selection of the link dimensions and attachment locations on the frame 11. The solution found in the present invention allows for the dimensions to deviate slightly within normal manufacturing tolerance without the lock up or reversal issues that previously existed in the drive mechanism design.

In each of the embodiments, the scooter 10 and the scooter 10A it is understood that between the pedals 22L and 22R a chain guard or chain cover (not illustrated) will be provided in order to provide additional safety for the rider. These component features are not illustrated in order to provide a clear view of the driving mechanism 20 of the present invention and the unique pedal design coupled to the drive mechanism and frame structure of the vehicle including its unique step-down frame design and low center of gravity features.

Figure 8:
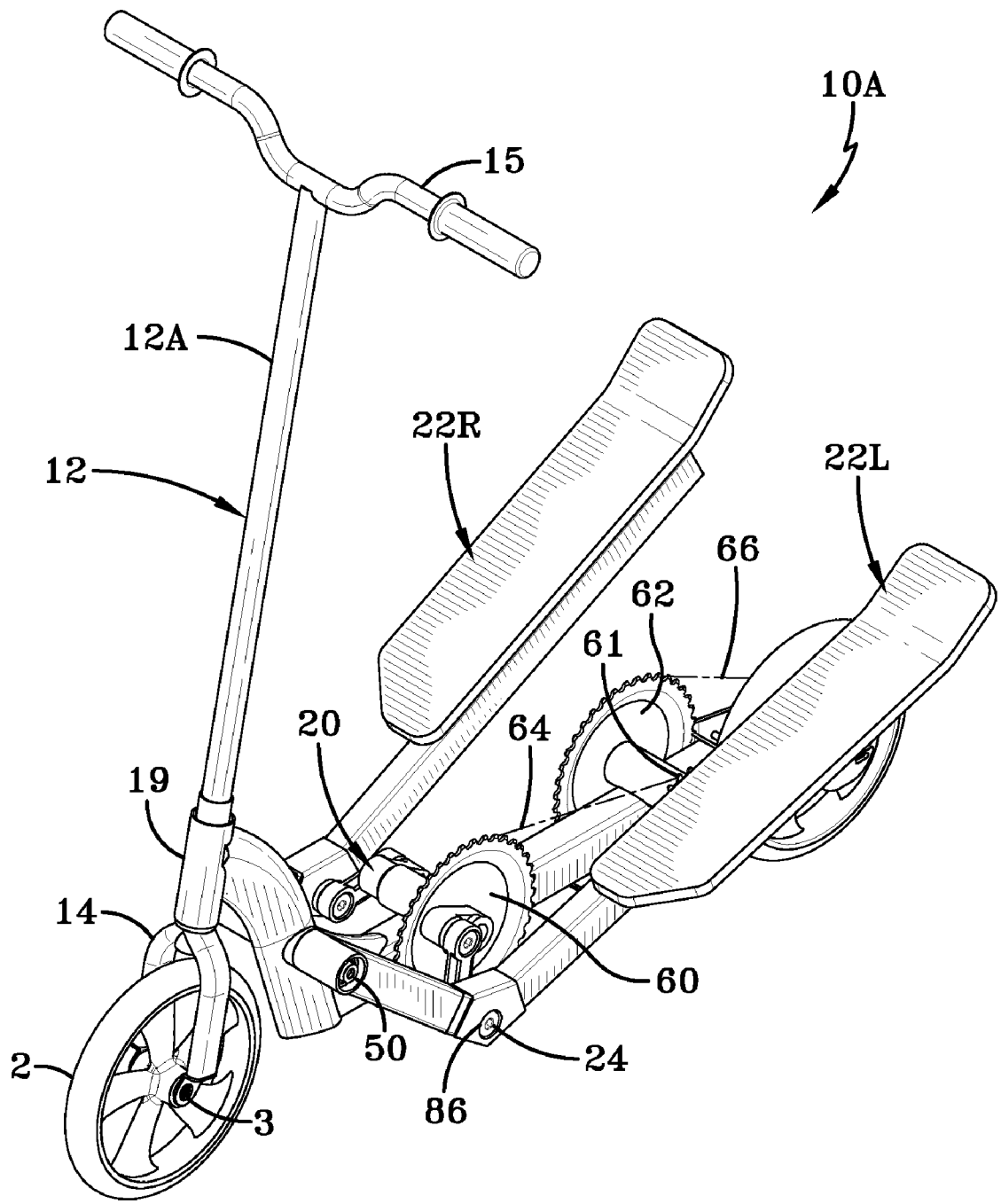
FIG. 8 is a perspective view of a second embodiment of the invention showing a two chain drive assembly with an additional intermediate bottom bracket.
Figure 9A:
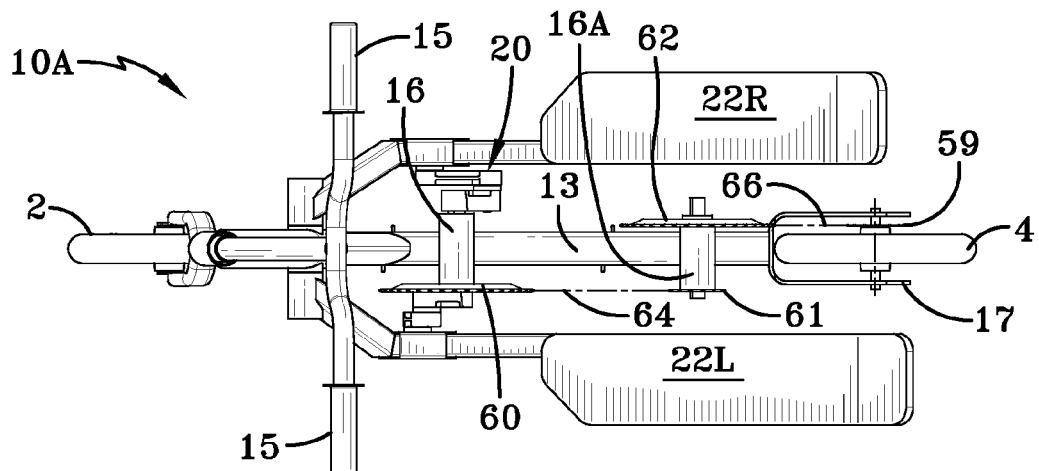
FIG. 9A is a top view of the scooter of FIG. 8.
Figure 9:
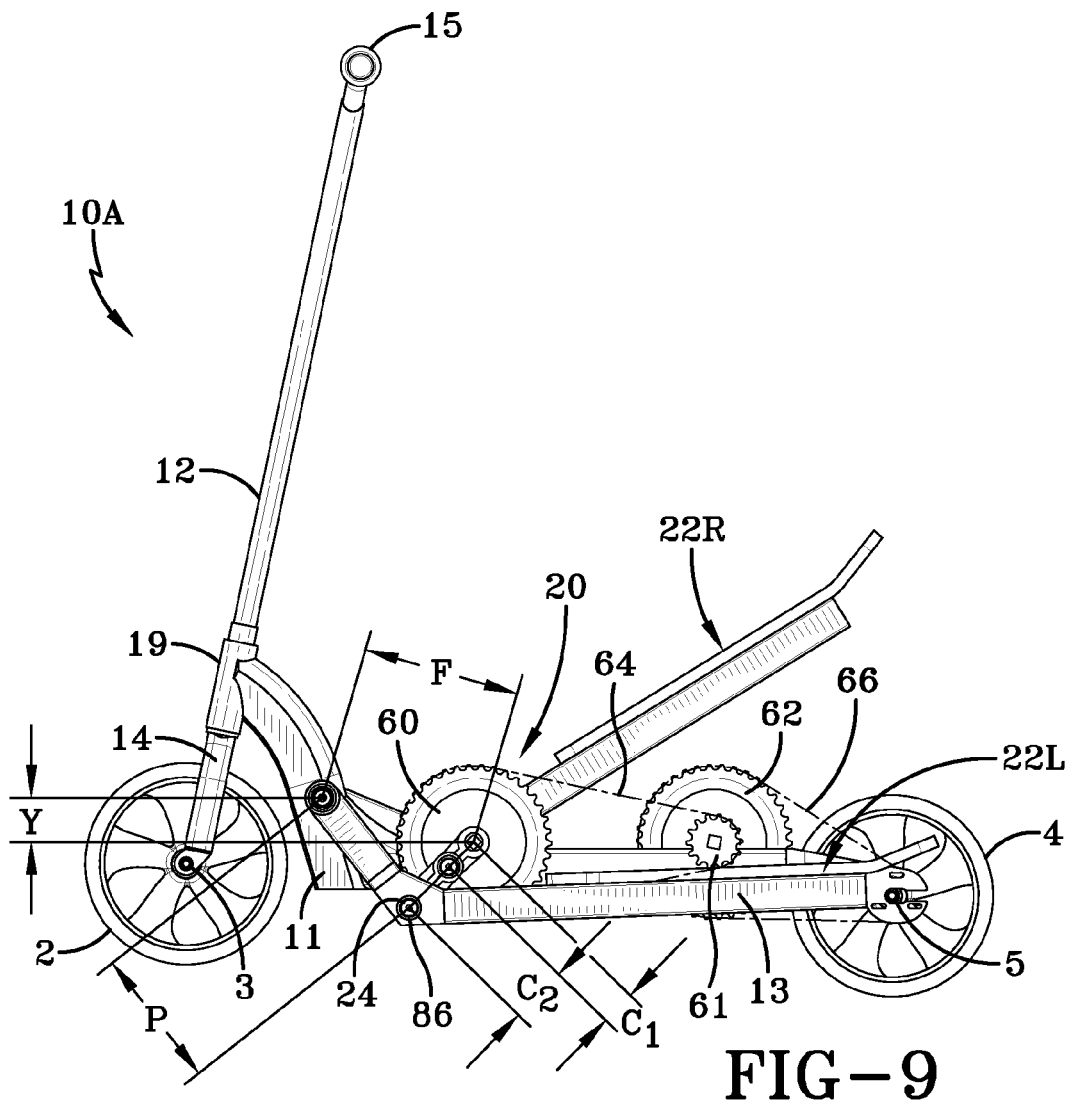
FIG. 9 is a side view of the scooter of FIG. 8.
Figure 10:
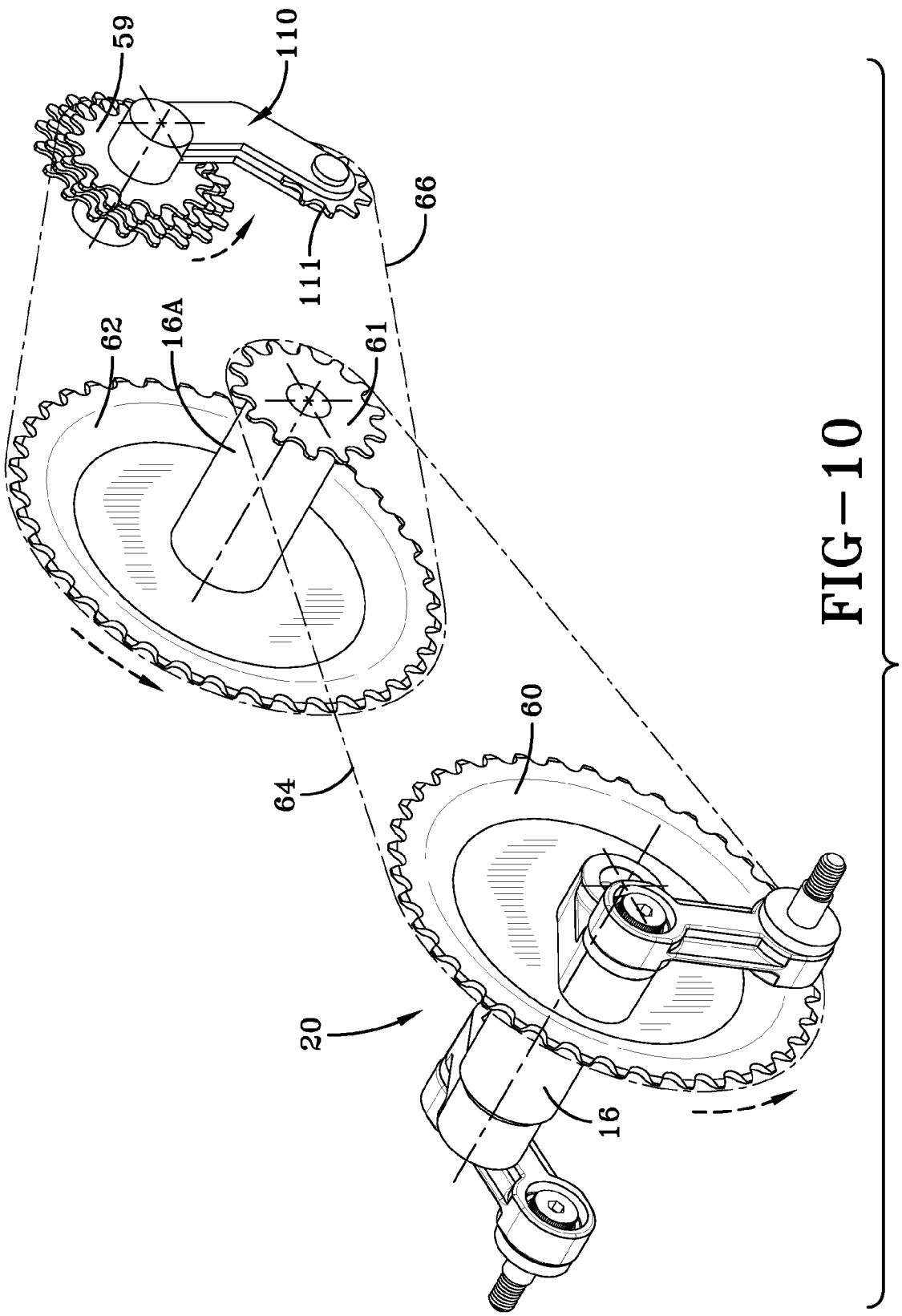
FIG. 10 is a plan view of the second embodiment modified with a bicycle derailleur attached to the rear hub with a shift mechanism.

The scooter 10A as illustrated in FIGS. 8-9, further can be improved by the use of a derailleur 110 on the rear wheel assembly such that multiple gear ratios can be provided such that the rider can be able to switch gears from a low gear to a high gear as one increases speed. This alternative embodiment addition shown in FIG. 10 to the device of scooter 10A is provided to show how even further enhanced speed achievements can be accomplished with the use of the present invention in combination with a bicycle type derailleur 110. As mentioned, each of the embodiments can be equipped with a free rolling clutch internally mounted inside the bottom brackets 16, 16A or the rear hub of the wheel such that in any of those locations the chains 64, 66 will be permitted to free wheel or coast such that the pedals do not have to be operated while the vehicle is in motion, providing a coasting or relaxing mode for the driver. Only when the pedals are pushed in a downward motion will the forward movement of the rear wheel 4 be driven by the driving mechanism, otherwise, on downhill slopes, the vehicle can be set such that the rider can coast down a hill also allowing ground clearance in a leaning turn. It is understood as these vehicles approach higher speed capabilities they can be provided with handlebar brakes that can be used on the front or rear wheels to slow the vehicle down if so desired. These and other features can be provided and are considered within the scope of the present invention.

The invention as described herein is directed to a scooter, as used herein, a scooter is a vehicle having typically two wheels, but could have three, but is so designed to have the rider standing on the pedals. The use of pneumatic tires, solid rubber or urethane tires does not change the device from a scooter to a bicycle. It is understood, however, the present invention with the addition of a seat for the rider, would take on the appearance of a pedal drive bicycle, as such the use of the present invention with a seat would also be considered within the scope of the present invention, but it must be appreciated that the maximum driving speed of the rear wheel is most easily performed standing.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. An improved two wheeled reciprocating pedal driven scooter having a frame including a steering assembly attached to the frame, a front steering wheel attached to a front axle attached to the steering assembly at the frame, a rear drive wheel attached to a rear axle attached to a rear portion of the frame and a drive mechanism for rotating the rear drive wheel, the drive mechanism having a pair of reciprocating foot pedals, one foot pedal straddling each side of the frame, attached to and extending to a forward proximal hinged attachment location on the frame, the drive mechanism further having a drive sprocket positioned rearward of the forward proximal hinged attachment location and attached to a drive axle in a bottom bracket assembly on the frame, a pair of linkage connections attaching each foot pedal to the drive axle of the drive sprocket, one pair of linkage connections being adjacent to drive sprocket, the other pair of linkage connections connected on an opposite side of the frame to an end of the drive axle, each pair of linkage connections includes a crank link and a coupling link, a chain is attached to the drive sprocket and extends rearward to a rear wheel drive sprocket attached to a rear drive axle in a rear hub of the rear wheel, reciprocation movement of the foot pedals drives the rear wheel, the improvements to the two wheeled reciprocating pedal driven scooter characterized by: each of the foot pedals having a short portion and an intersecting long portion forming a bend at the intersection wherein an included angle θ between the short and long portions is 90 degrees or greater, the attachment location of the foot pedal to the coupling link being near or adjacent to the intersection forming the bend of the short and long portions of each foot pedal, the proximal hinge location being vertically located on a step down portion of the frame a distance "Y" at or above the center of the drive axle, the short portion of the pedal extending a distance from the proximal hinged location to the intersection of the long portion of the foot pedal to form the bend wherein the bend is located at or below the frame when the foot pedal is at the bottom of the stroke, wherein in use, when the long portion of one foot pedal is at the bottom of the foot pedal stroke it is substantially horizontal while the long portion of the other pedal is at the top of the stroke and is inclined to a maximum stroke angle α of less than 35 degrees relative to the horizontal.

2. The two wheeled reciprocating pedal driven scooter of claim 1 further comprises a free wheeling clutch mechanism being mounted in one of the bottom bracket or rear hub to enable the rear wheel to free wheel spin as the foot pedals are stationary in a coasting, non-reciprocating position.

3. The two wheeled reciprocating pedal driven scooter of claim 2 wherein the maximum stroke angle α is 29 degrees.

4. The two wheeled reciprocating pedal driven scooter of claim 1 wherein the drive mechanism forms a four bar linkage having the crank link, the coupling link, a pedal link and a virtual frame link, the four bar linkage being defined by the distance between centers, wherein the crank link dimension C1 extends between the center of the drive axle to the center of the coupling link and crank link attachment, the coupling link dimension C2 extends from the center of the coupling link and the crank link attachment to the center of the foot pedal attachment, the pedal link dimension P extends from the center of the coupling link and the foot pedal attachment to the center of proximal hinged location, and the virtual frame link dimension F extends from the center of the proximal hinged location to the center of the drive axle, wherein the crank link dimension C1 is less than the coupling link dimension C2 and the power is transmitted through the foot pedals to drive the coupling link and crank link to rotate the drive sprocket; the length of the crank link dimension C1 is less than 150 percent of the coupling link dimension C2.

5. The two wheeled reciprocating pedal driven scooter of claim 4 wherein the dimension P is less than the dimension F.

6. The two wheeled reciprocating pedal driven scooter of claim 4 wherein the dimensions C1, C2, P and F are within plus or minus 2 mm of the dimensions C1=38 mm; C2=64 mm; P=156 mm; and F=175 mm.

7. The two wheeled reciprocating pedal driven scooter of claim 1 wherein the dimension "Y" is greater than 44 mm.

8. The two wheeled reciprocating pedal driven scooter of claim 1 wherein the crank link adjacent the drive sprocket is pinned to or otherwise rotationally fixed to the drive sprocket and drive axle.

9. The two wheeled reciprocating pedal driven scooter of claim 1 wherein the included angle θ forms an angle in the range of 90 to 135 degrees.

10. The two wheeled reciprocating pedal driven scooter of claim 1 wherein the dimensions Y and P are within plus or minus 2 mm of the dimensions Y=48 mm and P=156 mm.

11. An improved two wheeled reciprocating pedal driven scooter having a frame including a steering assembly attached to the frame, a front steering wheel attached to a front axle attached to the steering assembly at the frame, a rear drive wheel attached to a rear axle attached to a rear portion of the frame and a drive mechanism for rotating the rear drive wheel, the drive mechanism having a pair of reciprocating foot pedals, one foot pedal straddling each side of the frame, attached to and extending to a forward proximal hinged attachment location on the frame, the drive mechanism further having a drive sprocket positioned rearward of the forward proximal hinged attachment location and attached to a drive axle in a bottom bracket assembly on the frame, a pair of linkage connections attaching each foot pedal to the drive axle of the drive sprocket, one pair of linkage connections being adjacent to drive sprocket, the other pair of linkage connections connected on an opposite side of the frame to an end of the drive axle, each pair of linkage connections includes a crank link and a coupling link, a first chain is attached to the drive sprocket and extends rearward to a first intermediate sprocket attached to an intermediate axle in a second bottom bracket fixed on the frame between the drive sprocket and rear drive wheel; a second intermediate sprocket is attached to the intermediate axle on an opposite side of the frame relative to the first intermediate sprocket, a second drive chain is connected to the second intermediate sprocket and extends rearward to a rear wheel drive sprocket attached to a rear drive axle in a hub of the rear wheel, reciprocation movement of the foot pedals drives the rear wheel, the improvements to the two wheeled reciprocating pedal driven scooter characterized by: each of the foot pedals having a short portion and an intersecting long portion forming a bend at the intersection wherein an included angle $\theta$ between the short and long portions is 90 degrees or greater, the attachment location of the foot pedal to the coupling link being near or adjacent to the intersection forming the bend of the short and long portions of each foot pedal, the proximal hinged location being vertically located on a step down portion of the frame a distance "Y" at or above the center of the drive axle, the short portion of the pedal extending a distance from the proximal hinge location to the intersection of the long portion of the foot pedal to form the bend wherein the bend is located at or below the frame when the foot pedal is at the bottom of the stroke, wherein in use, when the long portion of one foot pedal is at the bottom of the foot pedal stroke it is substantially horizontal while the long portion of the other pedal is at the top of the stroke and is inclined to a maximum stroke angle $\alpha$ of less than 35 degrees relative to the horizontal.

12. The two wheeled reciprocating pedal driven scooter of claim 11 further comprises a free wheeling clutch mechanism being mounted in one of the bottom brackets or rear hub to enable the rear wheel to free wheel spin as the foot pedals are stationary in a coasting, non-reciprocating position.

13. The two wheeled reciprocating pedal driven scooter of claim 12 wherein the maximum stroke angle $\alpha$ is 29 degrees.

14. The two wheeled reciprocating pedal driven scooter of claim 11 wherein the drive mechanism forms a four bar linkage having the crank link, the coupling link, a pedal link and a virtual frame link, the four bar linkage being defined by the distance between centers, wherein the crank link dimension C1 extends between the center of the drive axle to the center of the coupling link and crank link attachment, the coupling link dimension C2 extends from the center of the coupling link and the crank link attachment to the center of the foot pedal attachment, the pedal link dimension P extends from the center of the coupling link and the foot pedal attachment to the center of proximal hinged location, and the virtual frame link dimension F extends from the center of the proximal hinge location to the center of the drive axle, wherein the crank link dimension C1 is less than the coupling link dimension C2 and the power is transmitted through the foot pedals to drive the coupling link and crank link to rotate the drive sprocket; and wherein the length of the crank link dimension C1 is less than 150 percent of the coupling link dimension C2.

15. The two wheeled reciprocating pedal driven scooter of claim 14 wherein the dimension P is less than the dimension F.

16. The two wheeled reciprocating pedal driven scooter of claim 14 wherein the dimensions C1, C2, P and F are within plus or minus 2 mm of the dimensions C1=38 mm; C2=64 mm; P=156 mm; and F=175 mm.

17. The two wheeled reciprocating pedal driven scooter of claim 11 wherein the dimension "Y" is greater than 44 mm.

18. The two wheeled reciprocating pedal driven scooter of claim 11 wherein the crank link adjacent the drive sprocket is pinned to or otherwise rotationally fixed to the drive sprocket and drive axle.

19. The two wheeled reciprocating pedal driven scooter of claim 11 wherein the included angle $\theta$ forms an angle in the range of 90 to 135 degrees.

20. The two wheeled reciprocating pedal driven scooter of claim 11 wherein the dimensions Y and P are within plus or minus 2 mm of the dimensions Y=48 mm and P=156 mm.

\* \* \* \* \*